June 9, 1953  G. D. MATEER  2,641,384
UNIVERSAL FILLER WITH HOPPER AND COUNTER MECHANISM
CONTROLLED AUGER FEEDER THEREIN
Filed Jan. 5, 1949  3 Sheets-Sheet 3

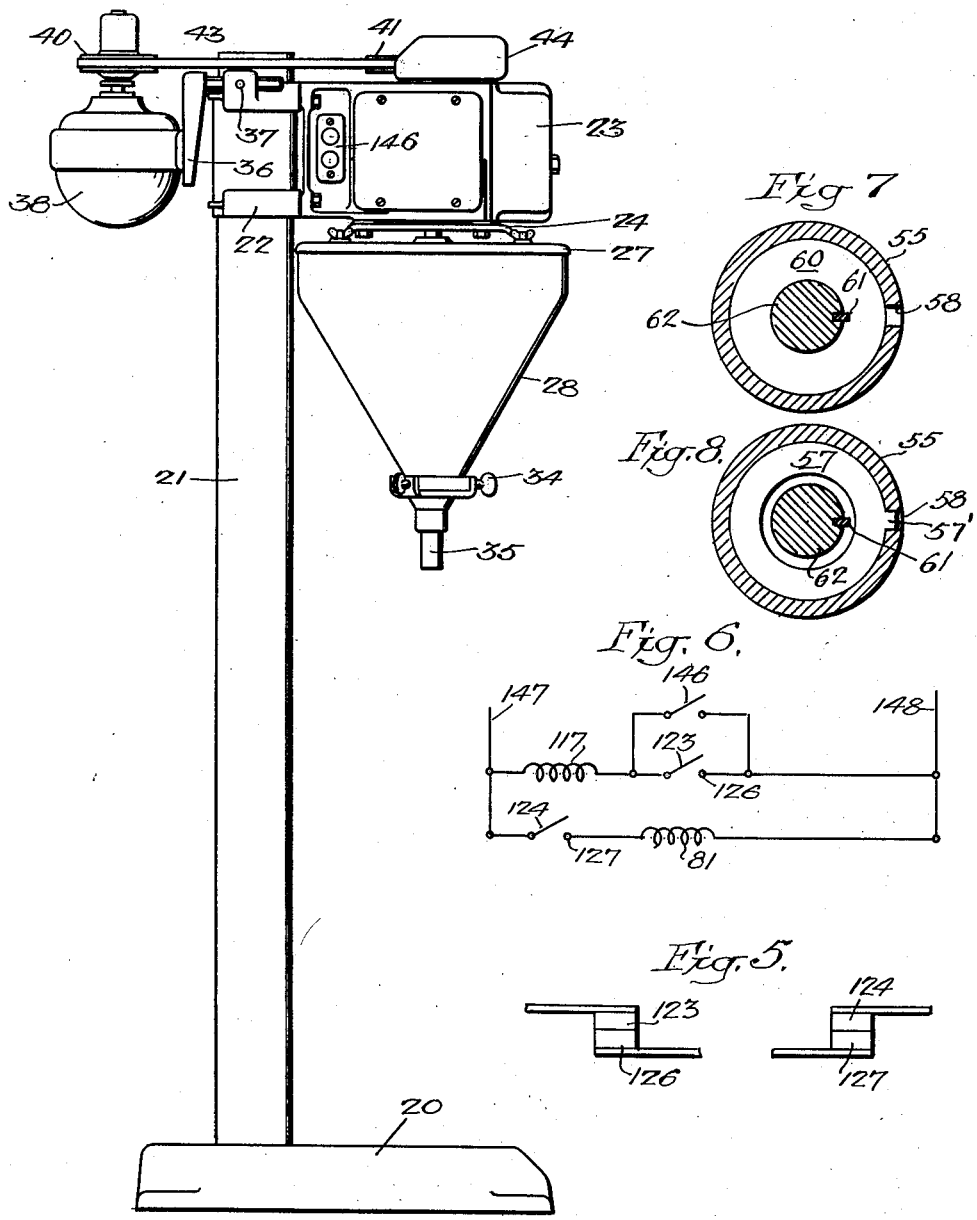

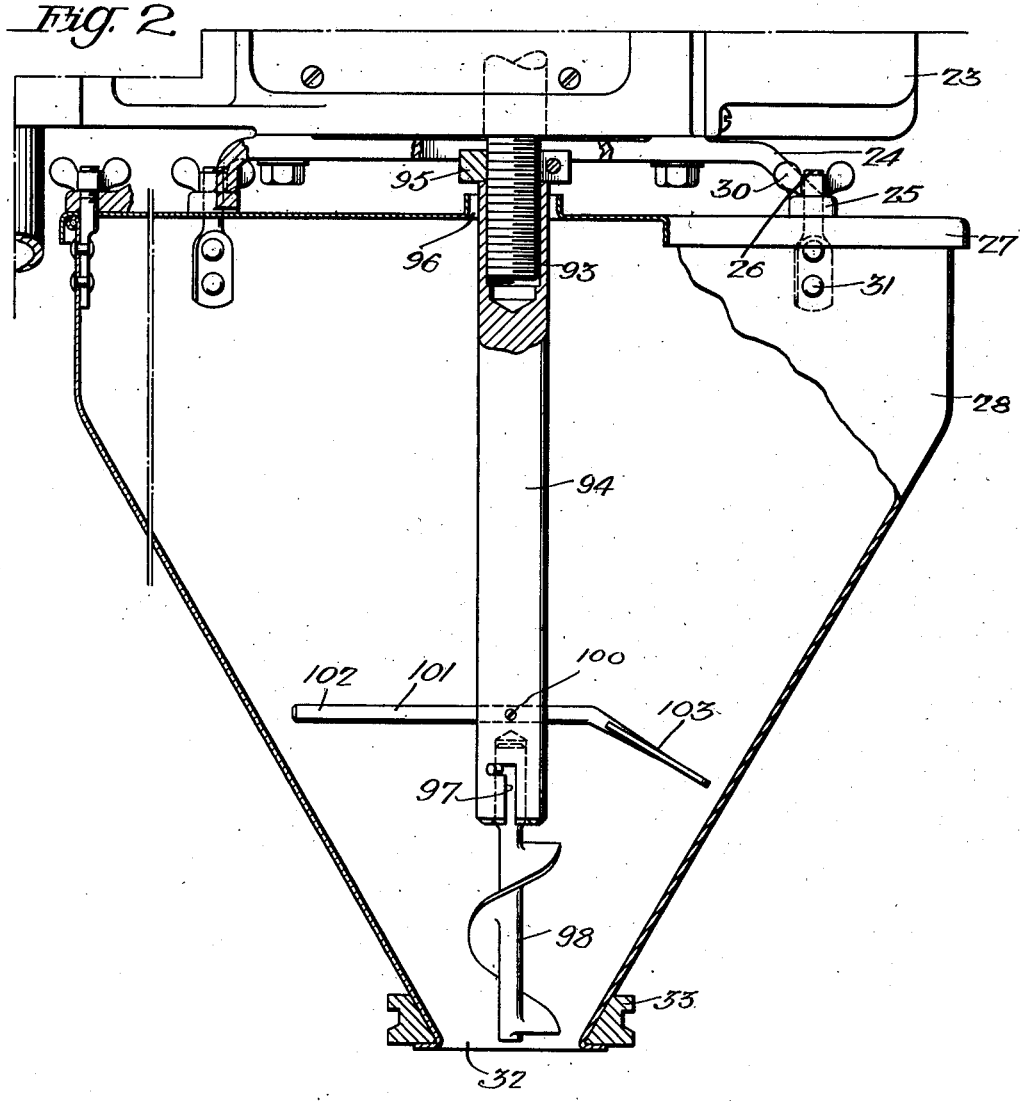

INVENTOR
George Diehl Mateer
BY
ATTORNEYS

Patented June 9, 1953

2,641,384

UNITED STATES PATENT OFFICE 2,641,384

UNIVERSAL FILLER WITH HOPPER AND COUNTER MECHANISM CONTROLLED AUGER FEEDER THEREIN

George Diehl Mateer, Ardmore, Pa.

Application January 5, 1949, Serial No. 69,345

3 Claims. (Cl. 222—70)

The present invention relates to feeders particularly of the character employed in dispensing dry and viscous materials.

A purpose of the invention is to obtain more accurate metering of dry and viscous materials by a feeder, avoiding or minimizing the effects of lost motion in the driving parts and overtravel when the feed is stopped.

A further purpose is to interpose a clutch between a driving and driven shaft, to drive a feeder from the driven shaft, to precisely control the duration of engagement of the clutch, and to effectuate the control by counting revolutions of the driven shaft, thus avoiding error due to slippage in the clutch and lost motion in the connections.

A further purpose is to pick up the clutch under the action of a solenoid, preferably acting on a clutch lever.

A further purpose is to apply spring loading to the clutch which determines the amount of load applied when the solenoid is energized.

A further purpose is to mount a driven shaft and a driving shaft in prolongation of one another on the same axis, to interpose a disc clutch between the driving shaft and the driven shaft and to exert axial pressure on the clutch preferably through a clutch operator and a bearing when the clutch is to pick up.

A further purpose is to provide a drag brake on the driven shaft to aid in stopping the driven shaft.

A further purpose is to permit adjustment of the exact vertical position of an auger feeder by adjusting the length of its driving shaft.

A further purpose is to make the hopper and feeder directly and readily detachable from the drive and control unit, in order to facilitate cleaning and to make possible sterilization and feeding under sterile conditions.

A further purpose is to simplify and cheapen the mounting of the feeder hopper, suitably by suspending it through quick attachment screws from a bracket above the hopper.

A further purpose is to vary the speed of the auger or other feeder without changing on the one hand the filling cycle or on the other hand the transfer cycle.

A further purpose is to provide completely electric drive and control of the feeding mechanism so as to facilitate synchronization with conveying or other equipment.

A further purpose is to make the control head self-contained and to permit replacement of other hoppers or feeding units on the same control head.

A further purpose is to mount an adjustable impeller on the auger shaft above the auger.

Further purposes appear in the specification and in the claims.

In the drawings I have chosen to illustrate one only of the numerous embodiments in which my invention may appear, choosing the form shown from the standpoints of convenience in illustration, satisfactory operation and clear demonstration of the principles involved.

Figure 1 is a side elevation of a feeder constructed in accordance with the present invention.

Figure 2 is an enlarged side elevation, partly in central vertical section, of the hopper, auger, feeder and related parts, breaking away the control head.

Figure 3 is an enlarged central vertical section through the control head.

Figure 6 is a circuit diagram.

Figures 7 and 8 are enlarged transverse sections slightly above the line 4—4 through the disc clutch at positions one disc apart, showing the differences in the discs.

Figure 4:
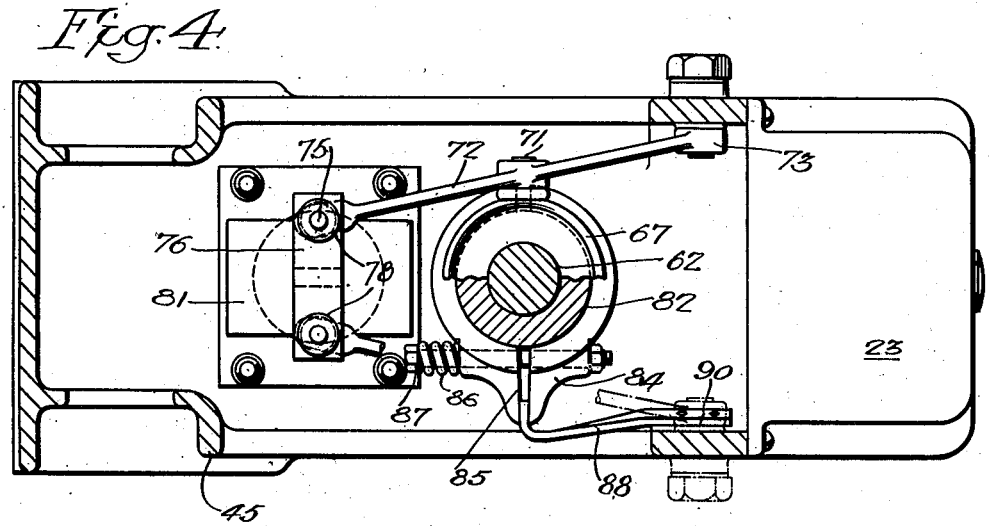
Figure 4 is a half section of Figure 3 on the line 4—4 and a half section of Figure 3 on the line 4'—4'.
Figure 5:
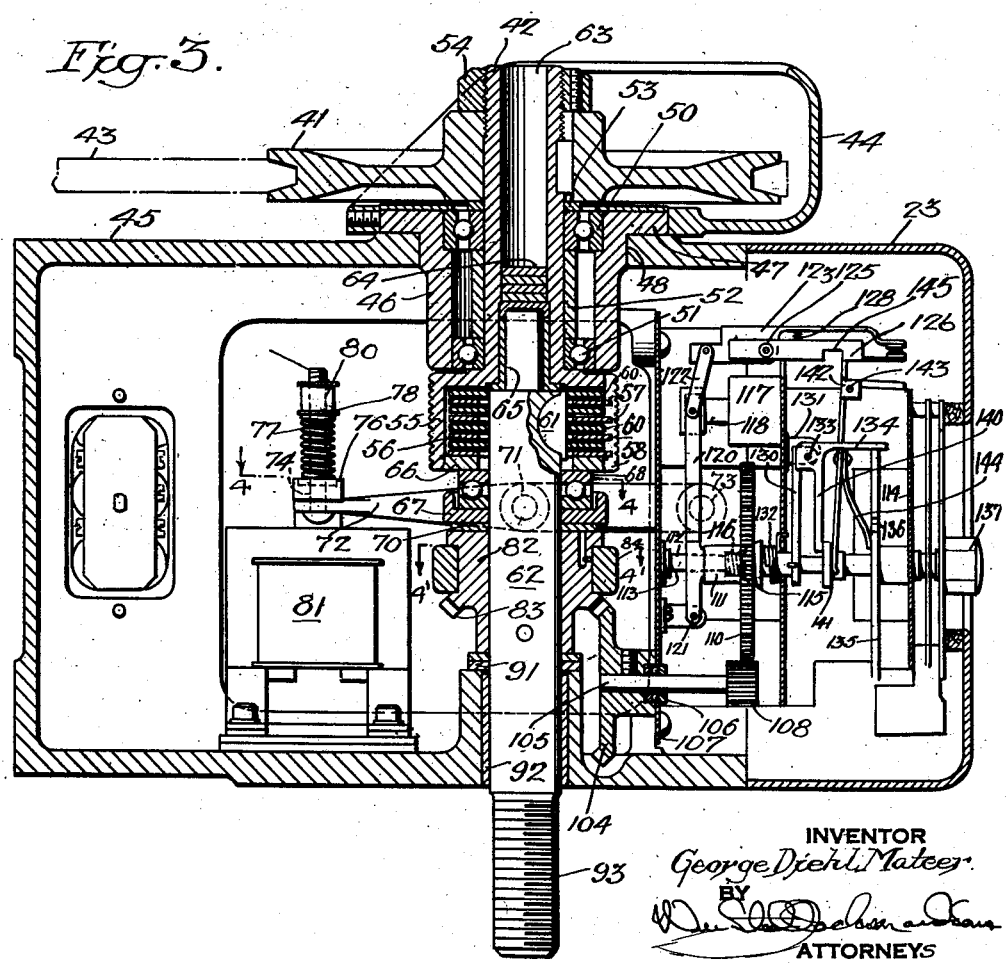
Figure 5 is a fragmentary end elevation of the contacts in the counter.

Describing in illustration but not in limitation and referring to the drawings:

The dispensing of solid materials such as powders and of viscous materials such as pastes, including foods, medicines, chemicals, insecticides and the like, incident to packaging of such materials, chemical treatment of fluids, chemical reactions and numerous other purposes, requires in some cases accurate metering of the quantity of material being supplied. Weighing devices are in many instances unduly complicated and expensive, whereas auger feeders have often been too inaccurate to be suitable. In accordance with the present invention, the accuracy of an auger feeder is greatly increased, the device being rendered suitable for packaging even of comparatively expensive materials, and for metering of additives in connection with chemical treatment and chemical reactions, as well as the compounding and blending of mixtures.

Many of the prior art auger feeding devices have been inefficient and inaccurate because of lost motion in the operating parts and overtravel at the time motion should cease. The device of the present invention is designed to avoid all such inaccuracy.

In accordance with the invention the counting of the number of revolutions of the auger device is accomplished directly on the driven shaft, so that errors are not introduced due to slippage in the clutch. The clutch itself is solenoid operated and is subjected to a spring regulated pressure when the solenoid is energized. When the counter counts out, the clutch solenoid is de-energized, and the auger stops immediately due to the action of a drag brake.

In accordance with the present invention it is possible to change the speed of rotation of the auger or other feeder to accord with the character of the material being fed, without in any way influencing the feeding cycle or influencing the transfer cycle between one feeding cycle and the next. For example, in the case of highly viscous materials it may be desirable to rotate the auger more slowly and in the case of very powdery materials or free flowing materials it may be desirable to rotate the auger more rapidly.

The hopper and auger construction is much improved. The shaft extension which carries the auger clutch is adjustable in length to obtain precise feeding at the mouth of the hopper. The hopper itself is readily removable by thumb screws from an overhead bracket. An impeller in the hopper adjustable for angle prevents arching of the contents which would interfere with uniformity of feed.

The feeder is desirably supported on a stand 20 having a column 21 which is engaged at the top by adjustable clamps 22 which support on the front a control head 23 having at its bottom a downwardly directed hopper bracket 24 which provides a number of openings 25 for receiving screws 26 projecting upwardly through the openings in the cover 27 of a cone hopper 28. The screws carry quick removable wing nuts 30 and the screws are suitably fastened to the hopper as by rivets 31. The lower end of the hopper has a mouth 32 surrounded by a retaining collar 33 having an annular external slot which is engaged by radial thumb screws 34 extending inwardly from a dispensing nozzle 35 which is of suitable size to direct the flow of the material being dispensed to the package, receptacle or other point of feeding.

At the opposite side of the column 21 from the control head is a motor bracket 36 adjustable at 37 with respect to the column and carrying an electric motor 38 driving a variable speed pulley 40 which drives a pulley 41 on a main driving shaft 42 by means of a V-belt 43. The pulley 41 is partially surrounded by a guard 44.

The main driving shaft 42 is supported in the housing 45 of the control head 23. A bearing sleeve 46 having an upper flange 47 extends into an opening 48 in the top of the housing and supports upper and lower ball bearings 50 and 51, the inner races of which are suitably pressed on the shaft 42. The bearings are separated by a spacer sleeve 52 surrounding the shaft. The shaft and associated mechanism are readily removable by simply taking out the bolts (not shown) which secure the flange 47 of the shaft to the housing.

The pulley 41 is spaced from the upper bearing by a washer 53 and is locked on the threaded end of the shaft by a nut 54.

On the lower end of the driving shaft and suitably integral therewith is the collar 55 of a disc clutch 56 having discs 57 (see Figures 7 and 8) which are secured against rotation with respect to the collar by extensions 57' into an external slot 58 and having interspersed discs 60 which engage interiorly with a key 61 in a driven shaft 62 which is in prolongation with and coaxial with the driving shaft. The driving shaft is hollow at 63 and the end is closed by plugs 64 and by a closure sleeve 65, against which the end of the driven shaft rests.

When the discs are free from axial compression the clutch slips, but when pressure is applied upwardly on an annular clutch element 66 which engages the lowermost clutch disc and is capable of compressing the discs, the clutch picks up. Pick-up is accomplished by an annular cup-shaped clutch operator 67 surrounding the driven shaft 62 but rotationally stationary, which holds a ball thrust bearing 68 between the clutch element 66 and the clutch operator 67, thus permitting the clutch element to turn with the clutch while the clutch operator does not rotate. The clutch operator in retracted position engages a washer 70 surrounding the driven shaft. At diametrically opposite points the clutch operator has pins 71 making pivotal engagement in levers 72 having fixed pivots 73 on the housing and suitably at the ends of the levers. The levers may desirably converge as shown in Figure 4, and at their opposite ends have preferably vertical openings 74 which pass bolts 75, which also extend through openings in a magnetically susceptible solenoid armature 76 which is of T shape and suitably bridges across above the ends of the levers. Above the solenoid armature the bolts are surrounded by compression springs 77, washers 78 and adjustment nuts 80 which regulate the compression of the springs. A solenoid coil 81 suitably mounted on the housing surrounds the armature.

The driven shaft 62 below the washer 70 carries a brake drum 82 keyed to the shaft and suitably integral with a bevel gear 83. The brake drum is surrounded by a brake band 84 which is split at 85 and urged toward its tightening position by a spring 86 surrounding an adjustment bolt 87 across the split at 85. To prevent the brake from rotating, an anchor 88, preferably of spring material, extends into the slot at 85 and is secured at 90 on the housing.

At the bottom of the housing, the driven shaft has thrust washers 91 and a journal bearing 92. The lower end of the driven shaft is threaded at 93 and as best seen in Figure 2 threads into a coaxial shaft extension 94, the threaded adjustment between the driven shaft and the shaft extension being locked by a lock nut 95. The shaft extension passes through an opening 96 in the cover of the hopper. The shaft extension at its lower end carries a bayonet slot chuck 97 which receives and holds a depending feeding auger 98. Mounted transversely of the shaft extension in an opening therein and held in place by a set screw 100 is an impeller 101 having a straight rod portion 102 at one side and a suitably oval blade 103 at the opposite side. The angle of inclination of the blade as well as the relative extension of the impeller on either side can be adjusted by loosening the set screw 100. The impeller prevents arching of the contents in the hopper.

In the control head the bevel gear 83 makes connection with a transverse bevel gear 104 secured on a shaft 105 journalled at 106 in a mounting plate 107 secured to the housing. At the opposite end the shaft 105 carries a pinion 108 which connects with a main counter gear 110, having a hub 111 which surrounds and journals on but is free from a shaft 112 journalling at the rear in a bearing 113 on the plate 107 and journalling at the front on a plate 114.

Secured on the shaft 112 is a cone clutch 115 which engages in a cone socket on the gear 110, the gear normally being urged away from the position of engagement by a spring 116. A clutch solenoid 117 having a magnetically susceptible armature 118 acts on a clutch lever 120 having a fixed pivot at 121 and surrounding and acting against the hub 111 of the gear 110 to urge the gear against the clutch when the solenoid 117 picks up. The armature 118 is also pivotally connected by a link 122 to a set of upper electrical contacts 123 and 124 having fixed pivot at 125. On the same fixed pivot are cooperating lower contacts 126 and 127 insulated from the upper contacts and urged away from the respective upper contacts by springs 128.

The shaft 112 carries on it a counter arm 130 which on return to initial position for zeroing engages a stop 131. The shaft is constantly urged toward the zero position by a torsion spring 132. Pivotally mounted at 133 on the outer end of the counter arm 130 is a tripping bellcrank 134 which rides a counter cam 135 having a cam projection 136 which indicates the position of counting out. The cam is adjusted to any desired angle by a knob 137 carrying a suitable adjustment dial and pointer forming no part of the present invention. The tripping bellcrank 134 has an opposite end 140 which rides against the flange of a collar 141 loose on the shaft and engaging the fork of a release lever 142 having a fixed pivot at 143 and engaging the lower portion of the lower contacts 126 and 127 at a suitably insulated position. A leaf spring 144 acting against the side of the cam 135 tends to hold the releasing lever in its non-release position. When the bottom of the releasing lever swings to the right in Figure 3 the top swings to the left allowing the upper end of the releasing lever to enter a releasing slot 145 in the lower contacts, thus causing contacts 126 and 127 to drop, breaking the circuits at 123, 126 and 124, 127.

The counter here employed is a very convenient form, but it will be evident that any other suitable counter may be used.

The electric circuit may suitably be of the character shown in Figure 6. A main dispensing switch 146 closes, either manually or automatically as desired, closing the circuit from electrical leads 147, 148 of a suitable electric current source through the counter clutch solenoid 117. This closes contacts 123, 126 and 124, 127 of the counter. The switch 146 which initiated the operation closes only instantaneously and it now breaks its parallel branch circuit, but the clutch solenoid 117 remains energized through the clutch contacts 123, 126. The closing of the switch 124, 127 energizes the main drive clutch solenoid 81, causing the main drive clutch to pick up and begin the driving of the driven shaft and the auger feeder. At the same time the bevel gears begin to rotate and the counter counts the rotations until the predetermined position for counting out is reached, at which the switches 123, 126 and 124, 127 are opened by the action of the tripping lever 134 on the releasing lever 142 against spring 144, causing the lower switch contacts 126 and 127 to drop and break the circuits.

In operation the device is set up at a desired point of dispensing, either for manual or automatic use. The hopper and control head are adjusted to the correct height by releasing and tightening the clamps 22. The belt is properly adjusted by releasing and tightening the motor mounting clamp at 37. The auger extension is then adjusted as to length by loosening and tightening the lock nut 95. The proper auger is inserted into the auger chuck at the end of the driven shaft extension, and the impeller is adjusted as to position and angle of the blade by loosening and tightening the set screw 100. The hopper is tightened in position by taking up the wing nuts 30.

The main driving shaft 42 is continuously driven by the motor during operation, but the driven shaft, auger and counter are held in stationary position except when the main driving clutch picks up. To assure that the position is stationary, the brake band 84 continuously engages the brake drum 82, applying this drag at all times.

When it is desired to operate the feeder, the main switch 146 is momentarily closed, energizing the counter clutch solenoid 117, which pulls its armature to the right in Figure 3, pulling the counter clutch lever to the right and forcing hub 111 and gear 110 to the right so that the gear engages the counter clutch cone 115. The driving connection is now established between the driven shaft 62 through the bevel gears 83 and 104, the pinion 108 and the gear 110 to drive the shaft 112 continuously as the driven shaft may be turned, thus moving tripping bellcrank 134 over the circumferential path on cam 135. At the same time the energizing of the counter clutch solenoid 117 pulls link 122 and closes switch contacts 123 and 124 against their cooperating switch contacts 126 and 127 respectively. The closing of these switches causes the clutch solenoid to remain energized notwithstanding that switch 146 opens, and energizes the main drive clutch solenoid 81, whose armature moves up in Figure 3 (since the bulk of the armature is normally below the center of the coil) tending to pull the lefthand end of clutch lever 72 up, and moving the clutch operator 67, thrust bearing 68 and clutch element 66 up to apply pressure between the clutch discs, and cause the clutch to pick up, thus starting rotation of the driven shaft.

The springs 77 limit the amount of force transmitted by the solenoid armature 76 to the clutch, thus permitting the solenoid to overtravel without applying too much pressure to the clutch, and assuring that the impact of the solenoid action is not transmitted to the clutch in the form of a damaging blow but rather is cushioned by the springs.

When the counter counts out, the switch elements 126 and 127 open, and this disconnects both the counter clutch solenoid and the main drive clutch solenoid, at which point the torsional spring 132 returns the counter and tripping bellcrank or lever to zero against the stop 131, while the driven shaft and auger stop instantly due to the drag of the brake. The main solenoid, being de-energized, permits the clutch discs to separate under the resilience in the clutch itself, under gravity and under the action of the springs 77.

In accordance with the invention, the feeder is very adaptable to a wide variety of dry and viscous materials. Great accuracy in feeding is achieved, since the count is accomplished directly on the impeller shaft and the brake assures instantaneous stopping. The main driving clutch solenoid picks up and releases instantaneously, while the springs avoid any damage from this effect.

The hopper impeller and auger construction is very readily taken apart for cleaning and very quickly reassembled for further use.

It will be understood that where reference is made to an auger feeder, it is contemplated that a rotor or any other similar type of feeder may be employed.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a feeder, a hopper, an auger feeder in the hopper controlling the feed therefrom, a driven shaft on the auger feeder, a driving shaft, a disc clutch operatively interposed between the driving shaft and the driven shaft, a lever pivotally mounted for applying pressure to and releasing pressure from the disc clutch, an electric solenoid operatively connected to the lever and when energized causing the lever to apply pressure to the disc clutch, and an electric counter operatively connected to the driven shaft to respond to the revolutions of the driven shaft, operatively connected to the solenoid and including a switch in the solenoid circuit by which the solenoid is disconnected when the counter counts out.

2. In a feeder, a hopper, an auger feeder controlling discharge from the hopper, a driven shaft mounting the auger feeder, a driving shaft coaxial with the driven shaft, a disc clutch operatively interposed between the driving shaft and the driven shaft and having a pressure element to which pressure can be applied axially to make the disc clutch pick up, a bearing interposed on the opposite side of the pressure element of the disc clutch from the clutch, a rotatably stationary clutch operator engaging the opposite side of the bearing, lever means pivoted at one end and engaging the clutch operator intermediate between the ends, a solenoid operatively connected to the end of the lever means opposite from the pivot and adapted when energized to bring pressure on the clutch element through the bearing and the operator, and an electric counter operatively connected to the driven shaft and to the solenoid and including a switch in the solenoid circuit by which the solenoid is disconnected when the counter counts out.

3. In a feeder, a hopper, an auger feeder controlling discharge from the hopper, a driven shaft mounting the auger feeder, a driving shaft coaxial with the driven shaft, a disc clutch operatively interposed between the driving shaft and the driven shaft and having a pressure element to which pressure can be applied axially to make the disc clutch pick up, a bearing interposed on the opposite side of the pressure element of the disc clutch from the clutch, a rotatably stationary clutch operator engaging the opposite side of the bearing, lever means pivoted at one end and engaging the clutch operator intermediate between the ends, a solenoid operatively connected to the end of the lever means opposite from the pivot and adapted when energized to bring pressure on the clutch element through the bearing and the operator, an electric counter operatively connected to the driven shaft and to the solenoid and including a switch in the solenoid circuit by which the solenoid is disconnected when the counter counts out, and a drag brake operatively connected with the driven shaft.

GEORGE DIEHL MATEER.

References Cited in the file of this patent

UNITED STATES PATENTS

| Number | Name | Date |
|---|---|---|
| 363,068 | Hutson et al. | May 17, 1887 |
| 399,187 | Dawson | Mar. 5, 1889 |
| 661,679 | Wyckoff | Nov. 13, 1900 |
| 1,257,910 | Meves | Feb. 26, 1918 |
| 1,311,227 | Hartman | July 29, 1919 |
| 1,499,338 | Bond | July 1, 1924 |
| 1,526,101 | Sund | Feb. 10, 1925 |
| 1,850,260 | Daly | Mar. 22, 1932 |
| 1,930,290 | Stresau | Oct. 10, 1933 |
| 2,066,131 | White | Dec. 29, 1936 |
| 2,278,824 | Brotman | Apr. 7, 1942 |
| 2,305,350 | Harper | Dec. 15, 1942 |
| 2,330,862 | Bleam | Oct. 5, 1943 |
| 2,359,367 | Kerr-Lawson | Oct. 3, 1944 |
| 2,375,422 | Leland | May 8, 1945 |
| 2,415,854 | Sheffield | Feb. 18, 1947 |
| 2,469,269 | Lear | May 3, 1949 |
| 2,532,913 | Higginbottom | Dec. 5, 1950 |